Feb. 5, 1952      G. S. ADOLFSON      2,584,777
CLEARANCE INDICATING ARM
Filed April 18, 1949
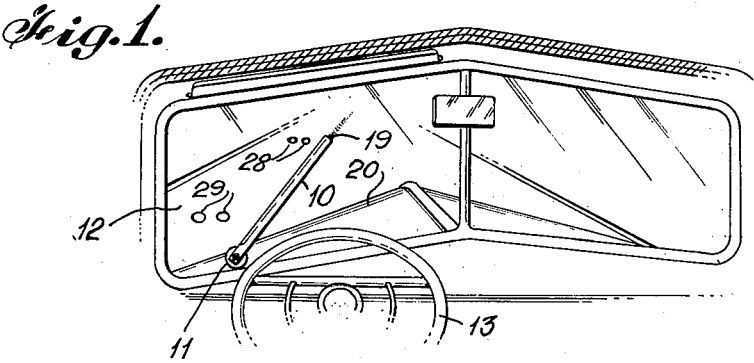
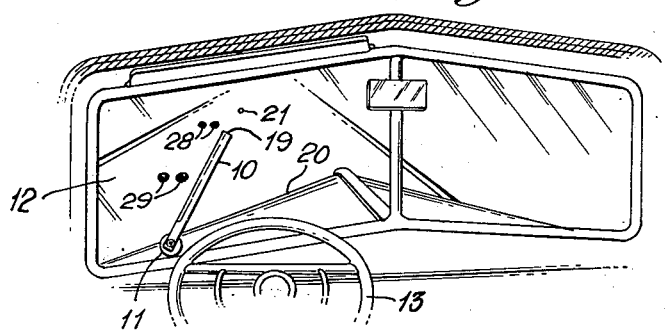
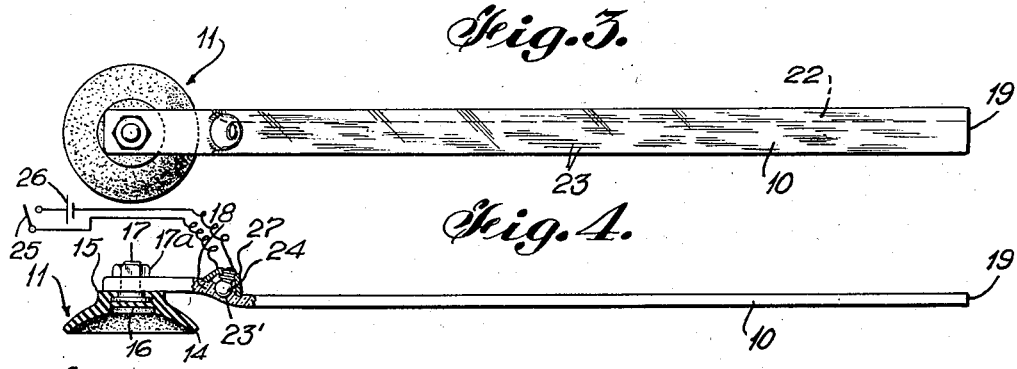
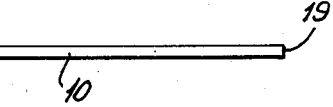
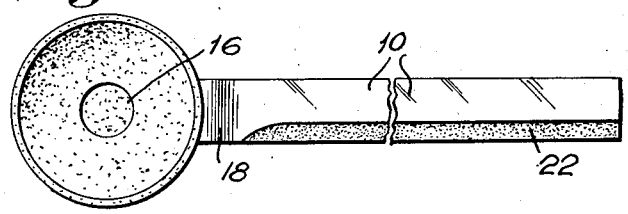
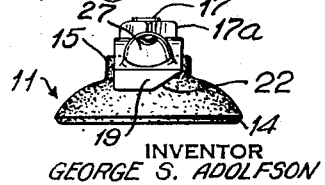
INVENTOR
GEORGE S. ADOLFSON
BY Edward Thomas
ATTORNEY Patented Feb. 5, 1952

2,584,777

UNITED STATES PATENT OFFICE 2,584,777

CLEARANCE INDICATING ARM

George S. Adolfson, Jersey City, N. J.

Application April 18, 1949, Serial No. 88,087

3 Claims. (Cl. 33—46)

This invention relates to guide devices in the form of what may well be termed a phantom center-line for automobile drivers.

Safety and mental comfort have been greatly enhanced by the white lines often painted on modern streets and roads, especially by the white center line, but automobile drivers often feel correspondingly handicapped when they lack the assistance of such a line. The driver lacks mental assurance and general equilibrium when he loses the line, and often feels nervous in a way that is unjustified.

According to the present invention there is provided a device on the usual automobile windshield, a device which may be easily applied and easily removed, which supplies the missing basis for security normally given by the white painted center line of the street.

In the form shown, the device may be attachable to any ordinary automobile windshield, as by a pivot on a suction cup, and, as shown, includes an arm, preferably transparent plastic, such as "lucite," which may be swung on the cup when the cup lies near the lower left-hand corner of the windshield.

With the cup set at that point a person, sitting in the driver's seat, may readily swing the arm diagonally across the windshield to a point where it lies upon the usual white center line as viewed from the driver's seat, or coincides with that line, provided the car is pointed along the right-hand lane at such a distance from the center line that the driver sees the nearer part of that line concealed by the center of the cup.

Preferably the arm is so mounted upon the cup that its free end bears frictionally against the windshield so that it will not shift by any ordinary jar.

It is found advantageous to bevel the one edge, say the upper edge, without polishing the bevel, so that the bevel appears as a white line by daylight.

It is also advantageous to faintly scratch or faintly abrade the smooth polished long faces of the transparent bar so that the bar shows with some contrast against the more transparent glass.

Such faint scratches cause the bar to shine faintly at night when its interior is illuminated as by a small electric bulb which may be electrically lighted and projects below the surface of the bar near the pivot at the suction cup.

The bar, after being properly adjusted by the aid of a visible white line, proves very helpful at night when the bright lights of approaching cars make the center white line almost invisible. With the bar properly placed it becomes a phantom white line, and the driver rests assured that the headlights of approaching cars to the left of the phantom line will be passed safely, while any object or light to the right of the phantom line shows as a probable danger signal. Thus approaching headlights to the left of the arm carry a message of safety, instead of the usual fear.

If the car is likely to be used by some one different from the usual driver, requiring a different setting of the arm, the proper setting for any one person may be shown by a bit of adhesive tape just beyond the swinging end of the arm. Each person may have a distinctively colored bit of tape.

Other features and advantages will hereinafter appear.

In the accompanying drawings:

Fig. 1 shows an arm mounted on a windshield as seen from the interior of the car.

Fig. 2 shows the arm set to suit the position of another driver.

Fig. 3 is a face view of an arm pivoted on a suction cup.

Fig. 4 is an edge view of the same.

Fig. 5 is a fragmentary face view of the opposite face.

Fig. 6 is an end view of the arm.

In the form shown, as easily attached to a car in daily use, the bar 10 is shown as pivoted to an elastic suction cup 11 which adheres to an ordinary windshield 12, and as seen by a driver seated at the usual steering wheel 13.

In the form shown the suction cup 11 has the usual truncated spherical shape with edges 14, and a boss 15, closed on the inner face 16, and carrying a headed pivot bolt 17 around which the arm 10 swings and to which it is held by a nut 17-a. The edge of the cup is usually channeled to obtain better suction.

The arm 10 is found to be most satisfactory if straight for most of its length, but bent at 18 just beyond where it clears the cup 11 so that it is nearly parallel to the windshield at the cup, but at 18 bends toward the windshield 12 until it is fairly close to it, and then extends, sloping slightly toward the windshield 12, until its outer end 19 bears with a pressure of some ounces against the windshield 12.

This pressure serves to detain the arm 10 where set, and the length between the bend 18 and end 19 lies close to the glass of the windshield 12, so it approximates to the position the driver sees the usual white line on the roadway beyond the engine hood 20.

When the driver has placed the car properly on a roadway with a white center line he adjusts the arm 10 to overlie the white line as he sees it, and then may place a bit of adhesive tape 21 on the windshield 12, just clear of the end of the arm 10, colored, if desired, to indicate the identity of that driver's mark.

The driver then makes sure the nut 17–a is sufficiently tight so that the arm 10 cannot swing, but lies elastically but firmly bearing with its outer end 19 against the glass 12. The arm 10 may, however, be turned away manually to lie alongside the windshield edge.

The usual long beveled left-hand edge 22 of the arm facing the windshield 12 is preferably left with a "ground glass" effect on its face, so that it shows as a white line by daylight, giving a very natural effect to the driver. By night it shows as a dark line. If desired a better effect may be obtained by causing the rest of the arm 10 to shine as by internal illumination.

To effect this, the whole surface of the transparent arm 10 is faintly scratched as at 23 by rubbing longitudinally with a finely powdered abrasive, and a depression 23' is cut part way through the thickness of the arm 10. A very small electric lamp bulb 24 is mounted so as to project within the depression 23' and deliver light within the body of the arm 10, when connected by a switch 25 to a source of current diagrammatically shown at 26.

The bulb 24 is completely concealed by a hood 27 except where within the depression 23', with the result that the light passing within the bar 10 shows as diffused light on the scratched surface, making the bar 10 faintly but clearly visible. Then an approaching car showing headlights 28 or 29 to the left of the arm 10 is easily and automatically recognized as safe to approach and pass, the faint scratches cause a useful luminosity or glow from outside impinging light, even with no light in any depression 23'.

The hood 27 may be cemented to the frame and carry a mount for the bulb 24.

Having thus described in some detail certain embodiments of the invention, what is claimed is:

1. A transparent arm adapted to swing over the windshield of an automobile so as to coincide with a highway lane boundary line, as seen from the driver's seat, said arm having an end to bear against the windshield, and a pivot on which said arm may swing, said arm having one surface slightly roughened, and a shielded light mounted on said arm adapted to deliver light within the arm and illuminate its slightly roughened surface.

2. A transparent arm having a scratched surface adapted to appear luminous by the light of an approaching automobile and adapted to swing lengthwise over a windshield of an automobile to a position to function as if it were the lengthwise boundary line, and a suction cup on which it is pivoted, said cup adapted to seize said windshield and pivotally hold said arm lengthwise close to the windshield of an automobile so that it may be set in alignment with a highway boundary as seen by a person on the seat, but thereafter function as if it were the highway boundary line and establish a measure of a safe passing clearance between the car carrying it and another object seen through the windshield.

3. A transparent arm having a depression and having a slightly roughened surface and adapted to swing over the windshield of an automobile so as to coincide with a highway lane boundary line as seen from the driver's seat, having an end adapted to bear against the windshield, and a pivot on which it may swing, and a shielded light bulb projecting within said depression in the arm adapted to deliver light within the arm and illuminate its slightly roughened surface.

GEORGE S. ADOLFSON.

REFERENCES CITED

The following references are of record in the file of this patent:

UNITED STATES PATENTS

| Number | Name | Date |
| --- | --- | --- |
| 846,006 | Bryson | Mar. 5, 1907 |
| 1,429,166 | Rommer | Sept. 12, 1922 |
| 1,610,477 | Sanford | Dec. 14, 1926 |
| 1,879,592 | Thomas | Sept. 27, 1932 |
| 2,060,771 | Kempf | Nov. 10, 1936 |
| 2,347,665 | Christensen et al. | May 2, 1944 |
| 2,360,368 | Rubissow | Oct. 17, 1944 |
| 2,378,249 | Ruth | June 12, 1945 |